June 21, 1932.  W. ZETZMAN  1,864,394

CULTIVATOR ATTACHMENT

Filed Sept. 22, 1931  2 Sheets-Sheet 1

Inventor

William Zetzman

By Clarence A. O'Brien
Attorney

June 21, 1932.  W. ZETZMAN  1,864,394
CULTIVATOR ATTACHMENT
Filed Sept. 22, 1931   2 Sheets-Sheet 2

Inventor
William Zetzman
By Clarence A O'Brien
Attorney

Patented June 21, 1932

1,864,394

UNITED STATES PATENT OFFICE

WILLIAM ZETZMAN, OF POST, TEXAS

CULTIVATOR ATTACHMENT

Application filed September 22, 1931. Serial No. 564,386.

This invention relates to a cultivator attachment and more particularly to a device of this character embodying pairs of rotatable disks, shovels and weed cutters, and has for one of its important objects to provide, in a manner as hereinafter set forth, a novel construction, combination and arrangement of parts through the medium of which the aforementioned elements may be expeditiously adjusted as desired and used simultaneously or separately.

Other objects of the invention are to provide a cultivator attachment of the character described which will be simple in construction, strong, durable, efficient and reliable in use and which may be manufactured at low cost and installed on conventional cultivators without the necessity of materially altering said cultivators structurally.

All of the foregoing and still further objects and advantages of the invention will become apparent from a study of the following specification, taken in connection with the accompanying drawings wherein like characters of reference designate corresponding parts throughout the several views, and wherein:—

Figure 3:
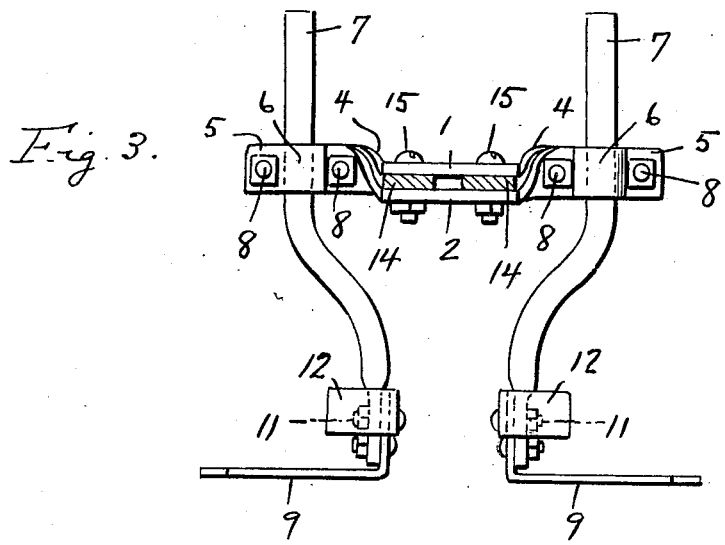
Figure 3 is a view in vertical cross section taken substantially on the line 3—3 of Figure 1 looking forwardly, as indicated by the arrow.
Figure 4:
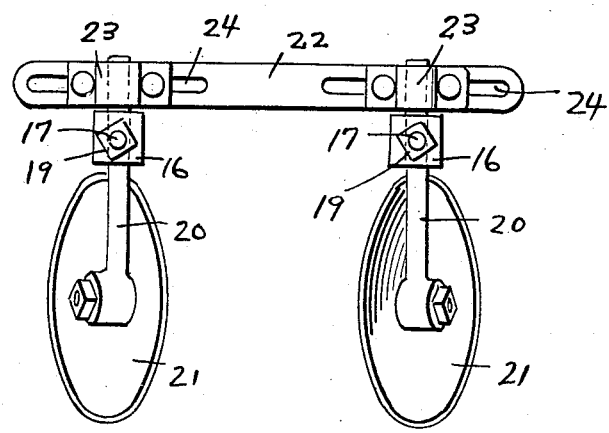
Figure 4 is a view in front elevation showing the means of adjustably connecting the upper end portions of the disk supporting shanks together.
Figure 5:
Figure 5 is a detail view in perspective of one of the shank clamps.

Referring now to the drawings in detail, it will be seen that the attachment constituting the present invention comprises a pair of upper and lower plates 1 and 2, respectively, of metal which are secured together in vertically spaced relation by suitable means such as the screws 3 any number of which may be provided. Formed integrally with the upper plate 1 and projecting laterally therefrom are the quarter twisted apertured arms 4 and formed integrally with the lower plate 2 are the laterally projecting, quarter twisted arms 5 which are upwardly offset with respect to said lower plate 2 for the purpose of disposing said arms 5 in opposed relation to the arms 4. The arms 5 are formed with loops or substantially U-shaped portions 6 therein for the reception of the knife supporting shanks 7, the lower end portions of which are inwardly offset, as illustrated to advantage in Figure 3 of the drawings. The arms 4 and 5 constitute clamps for the shanks 7 which are drawn together by the nut equipped bolts 8.

Horizontally disposed, rearwardly diverging knives 9 are adjustably secured, as at 10, on the lower end portions of the shanks 7. Also, secured for swinging adjustment, as at 11, on the lower portions of the shanks 7 are the rearwardly diverging guards or shields 12 which are adjacent the knives 9.

Front and rear pairs of beams 13 and 14, respectively, are mounted for swinging movement in a horizontal plane between the plates 1 and 2 through the medium of the nut equipped pivot bolts 15 which extend vertically through the plates. At their free ends the beams 13 and 14 terminate in the substantially U-shaped portions 16 having vertically aligned openings therein. The bight portions of the U-shaped portions 16 are also apertured for the passage of the threaded shanks 17 of the clamps 18 which are in the form of eyes. Adjusting nuts 19 are threaded on the shanks 17 of the clamps 18 for engagement with the U-shaped portions 15.

Extending vertically and adjustably through the substantially U-shaped portions of the front beams 13 are the shanks 20 having operatively mounted thereon the disks 21. The shanks 20 are secured in adjusted position on the front beams 13 by the clamps on said front beams through which the shanks 20 also extend. A transverse brace 22 in the form of a metallic bar extends between the upper end portions of the shanks 20 above the front beams 13 and is connected thereto through the medium of the clamps 23. The brace 22 is provided with slots 24 to permit adjustment of the clamps 23 thereon.

Shanks 25 are adjustably mounted on the rear portions of the beams 14 and have fixed on their lower end portions the cultivator shovels 26. The shanks 25 may, of course, be rotatably or vertically adjusted relative to the beams 14 as desired.

Figure 1:
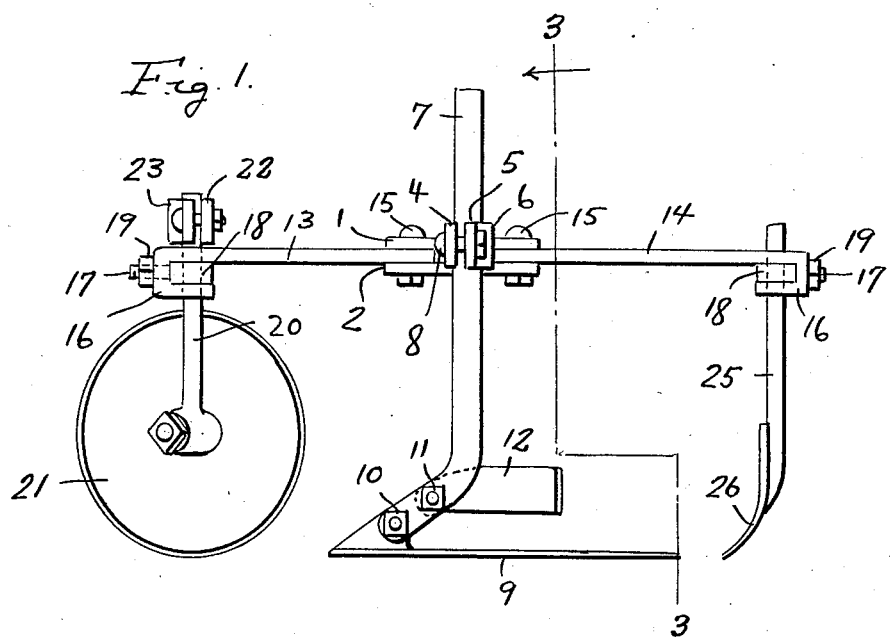
Figure 1 is a view in side elevation of a cultivator attachment in accordance with the present invention.
Figure 2:
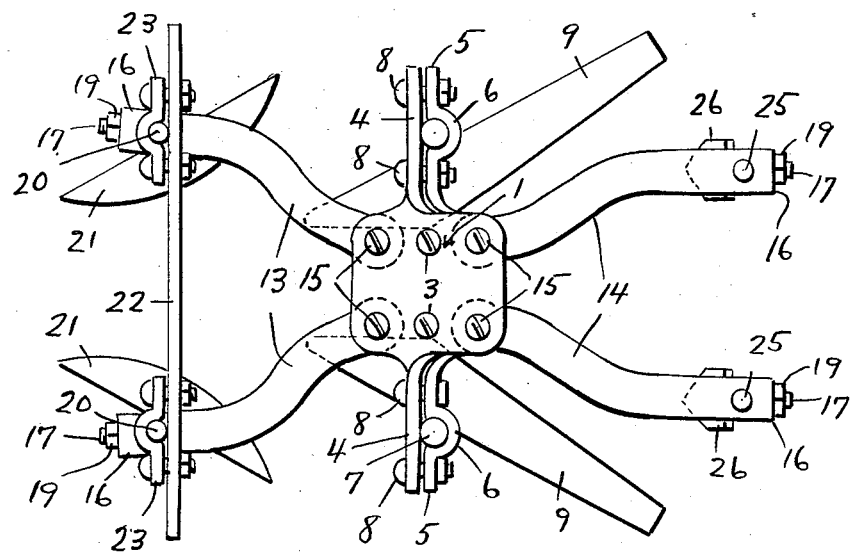
Figure 2 is a view in top plan thereof.

When used as illustrated to advantage in Figure 2 of the drawings, the disks 21 may function as guides and the knives 9, as weeders. The shovels 26 are to be adjusted to throw dirt toward the row. The shanks 25 carrying the shovels 26 may be removed and the shanks 20 with the disks 21 thereon may be mounted on the rear beams 14 and when this is done the knives 9 function as weeders, as usual, and the disks 21 are adjusted to throw the dirt toward the row. When so used the front beams 13 may be removed. Also, when the disks 21 are mounted on the rear beams 14, said disks may be adjusted to throw the dirt away from the row. Also, if desired, the disks 21, the shanks 20 and the front beams 13 may be removed and the shovels 26 adjusted to throw the dirt toward or away from the row. The shape of the forward end portions of the knives 9 is such that said knives will cut weeds growing out of the sides of a furrow. The knives 9, by reason of the shape of the forward end portions thereof, also will throw a certain amount of dirt toward the row. The attachment may be secured on the cultivator in any suitable manner.

It is believed that the many advantages of a cultivator attachment constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A cultivator attachment comprising upper and lower plates, arms formed integrally with the upper plates and projecting laterally therefrom, arms formed integrally with the lower plate and projecting therefrom in opposed relation to the first named arms, shanks extending vertically between the opposed arms, means for clamping the opposed arms around the shanks for adjustably securing said shanks, knives mounted on the shanks, beams connected by one end to the plates for swinging adjustment in a horizontal plane, and earth working elements mounted on the beams.

2. A cultivator attachment comprising vertically spaced plates, pairs of opposed arms projecting laterally from the plates, shanks extending vertically between the pairs of opposed arms, means for clamping the opposed arms around the shanks for adjustably clamping said shanks, knives mounted on the shanks, front and rear pairs of beams pivotally connected by one end to the plates for swinging adjustment in a horizontal plane, substantially U-shaped portions on the free ends of the beams, shanks extending for vertical adjustment through the U-shaped portions, means for securing the shanks in adjusted position, and earth working elements mounted on the last named shanks.

3. A cultivator attachment comprising vertically spaced plates, pairs of opposed arms projecting laterally from the plates, shanks extending vertically between the pairs of opposed arms, means for clamping the opposed arms around the shanks for adjustably clamping said shanks, knives mounted on the shanks, front and rear pairs of beams pivotally connected by one end to the plates for swinging adjustment in a horizontal plane, substantially U-shaped portions on the free ends of the beams, shanks extending for vertical adjustment through the U-shaped portions, means for securing the shanks in adjusted position, earth working elements mounted on the last named shanks, a brace extending transversely between certain of the last named shanks, and means for adjustably connecting said certain of the last named shanks to the brace.

In testimony whereof I affix my signature.

WILLIAM ZETZMAN.